US009547501B2

(12) United States Patent
Shichino

(10) Patent No.: US 9,547,501 B2
(45) Date of Patent: Jan. 17, 2017

(54) INFORMATION PROCESSING APPARATUS, STORAGE CONTROL APPARATUS, AND COMPUTER-READABLE RECORDING MEDIUM HAVING STORED PROGRAM

(71) Applicant: FUJITSU LIMITED, Kawasaki-shi, Kanagawa (JP)

(72) Inventor: Nobuyuki Shichino, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 168 days.

(21) Appl. No.: 14/477,926

(22) Filed: Sep. 5, 2014

(65) Prior Publication Data
US 2015/0095922 A1 Apr. 2, 2015

(30) Foreign Application Priority Data

Sep. 30, 2013 (JP) ................. 2013-204657

(51) Int. Cl.
G06F 3/00 (2006.01)
G06F 9/44 (2006.01)
G06F 3/06 (2006.01)
G06F 13/10 (2006.01)
H04L 29/08 (2006.01)
G06F 9/455 (2006.01)

(52) U.S. Cl.
CPC .......... *G06F 9/4411* (2013.01); *G06F 3/0605* (2013.01); *G06F 3/067* (2013.01); *G06F 3/0634* (2013.01); *G06F 13/102* (2013.01); *H04L 67/1097* (2013.01); *G06F 2009/45579* (2013.01)

(58) Field of Classification Search
None
See application file for complete search history.

(56) References Cited

U.S. PATENT DOCUMENTS 8,307,359 B1 11/2012 Brown et al.
2011/0321042 A1 12/2011 Yang et al.
2012/0054740 A1 3/2012 Chakraborty et al.
(Continued)

FOREIGN PATENT DOCUMENTS

JP 2000-207232 7/2000
JP 2011-65551 3/2011
JP 2012-9029 1/2012

OTHER PUBLICATIONS

Haibo et al. "Live Updating Operating Systems Using Virtualization" 2006.*
(Continued)

Primary Examiner — Lechi Truong
Assistant Examiner — Abdou Seye
(74) Attorney, Agent, or Firm — Fujitsu Patent Center

(57) ABSTRACT

The information processing apparatus includes a first device which is managed by a first OS, a second device which is managed by a second OS, and a processing unit. The processing unit causes the first OS and the second OS, the first OS to load a first maintenance driver corresponding to the first device, the first maintenance driver to perform maintenance control of the first device, the first OS to load a second maintenance driver corresponding to the second device, and the second maintenance driver to perform maintenance control of the second device. Therefore, it is possible to efficiently achieve the maintenance control of a plurality of devices, each of which is managed by a plurality of operating systems.

10 Claims, 8 Drawing Sheets

(56) References Cited

U.S. PATENT DOCUMENTS

| | | |
|---|---|---|
| 2012/0179804 A1 | 7/2012 | Katanp et al. |
| 2013/0275973 A1* | 10/2013 | Greenfield et al. ............... 718/1 |
| 2014/0156898 A1* | 6/2014 | Luo .................... G06F 13/4081 |
| | | 710/302 |

OTHER PUBLICATIONS

Extended European Search Report dated Feb. 17, 2015 for corresponding European Patent Application No. 14181382.4, 7 pages.

* cited by examiner

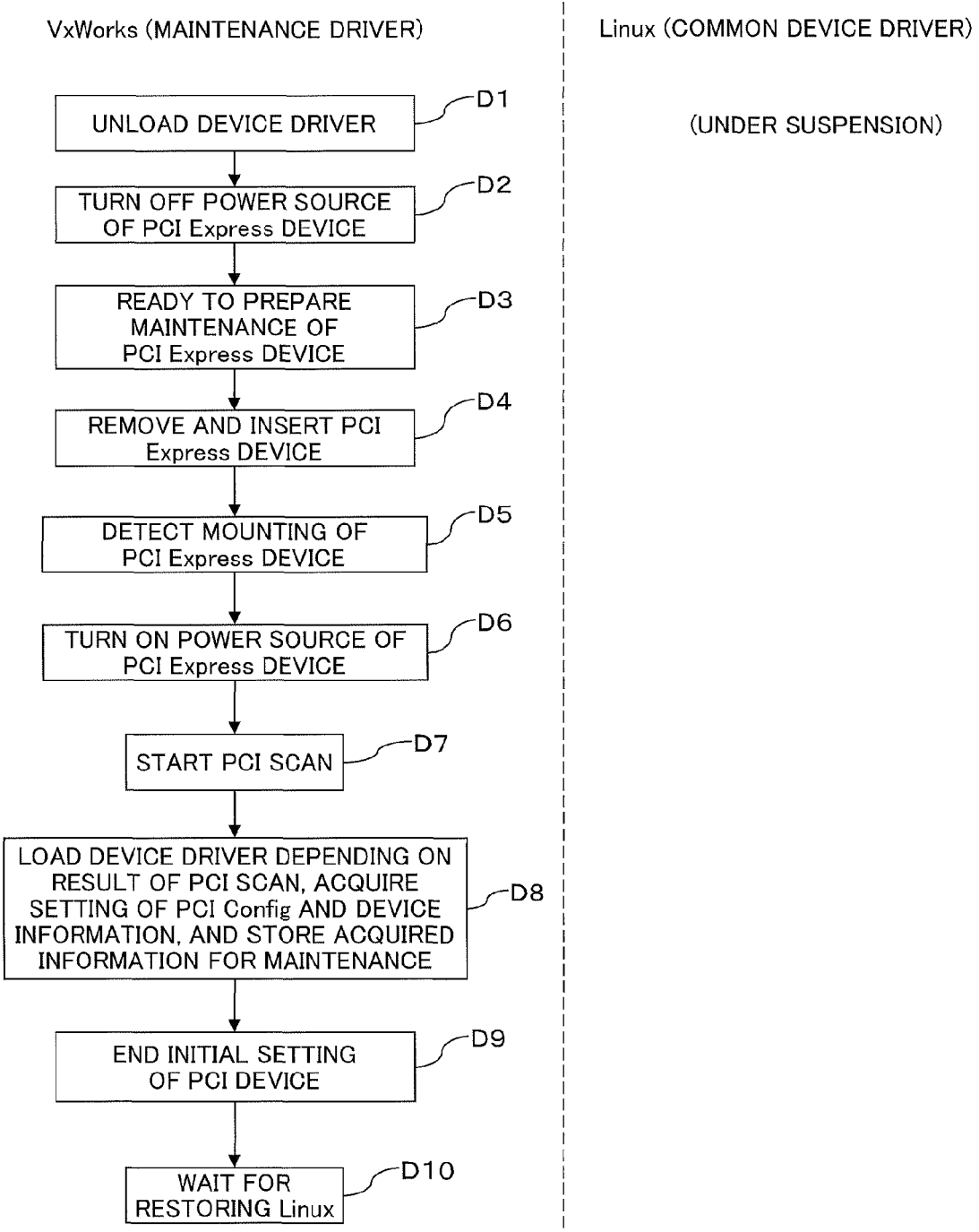

INFORMATION PROCESSING APPARATUS, STORAGE CONTROL APPARATUS, AND COMPUTER-READABLE RECORDING MEDIUM HAVING STORED PROGRAM

CROSS-REFERENCE TO RELATED APPLICATIONS

This application is based upon and claims the benefit of priority of the prior Japanese Application No. 2013-204657 filed on Sep. 30, 2013 in Japan, the entire contents of which are hereby incorporated by reference.

FIELD

The embodiments discussed herein are directed to an information processing apparatus, a storage control apparatus, and a computer-readable recording medium having stored a program.

BACKGROUND

As a network storage system, a network attached storage (NAS) and a storage area network (SAN) are well known.

The NAS connected to Ethernet (registered trademark) which is an existing network is easy in management compared to the SAN, but in many cases is degraded in performance or easily falls short in capacity. On the other hand, the SAN generally operates at a high speed compared to the NAS and is possible to store a larger volume of data, but it is expensive in price.

In order to improve efficiency in data storage and to reduce cost through a successful combination of advantages of these NAS and SAN, unification between the SAN and the NAS is being realized.

At this time, an SAN device is under control of an SAN operating system (OS), and an NAS device is under control of an NAS OS. However, since the devices under control of both the OSs are mounted as hardware of the unified storage apparatus, maintenance of the devices are desired to be performed in the common maintenance sequence. This is because when the configuration of the maintenance guide screen and the maintenance sequence are different with respect to each OS, it causes difficulties in use according to a user.

Therefore, maintenance control functions are doubly mounted for a plurality of OSs, which is inefficient.

Patent Document 1: Japanese Laid-open Patent Publication No. 2011-65551 A
Patent Document 2: Japanese Laid-open Patent Publication No. 2012-9029 A
Patent Document 3: Japanese Laid-open Patent Publication No. 2000-207232 A

SUMMARY

An information processing apparatus according to the present application includes a first device which is managed by a first operating system, a second device which is managed by a second operating system, and a processing unit. The processing unit causes the first operating system and the second operating system to operate, causes the first operating system to load a first maintenance driver corresponding to the first device, causes the first maintenance driver to perform maintenance control of the first device, causes the first operating system to load a second maintenance driver corresponding to the second device, and causes the second maintenance driver to perform maintenance control of the second device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 8 is a diagram for describing an activation exchange sequence of the storage control apparatus (information processing apparatus illustrated in FIG. 1 during a Linux suspension.

DESCRIPTION OF THE PREFERRED EMBODIMENTS

Figure 1:
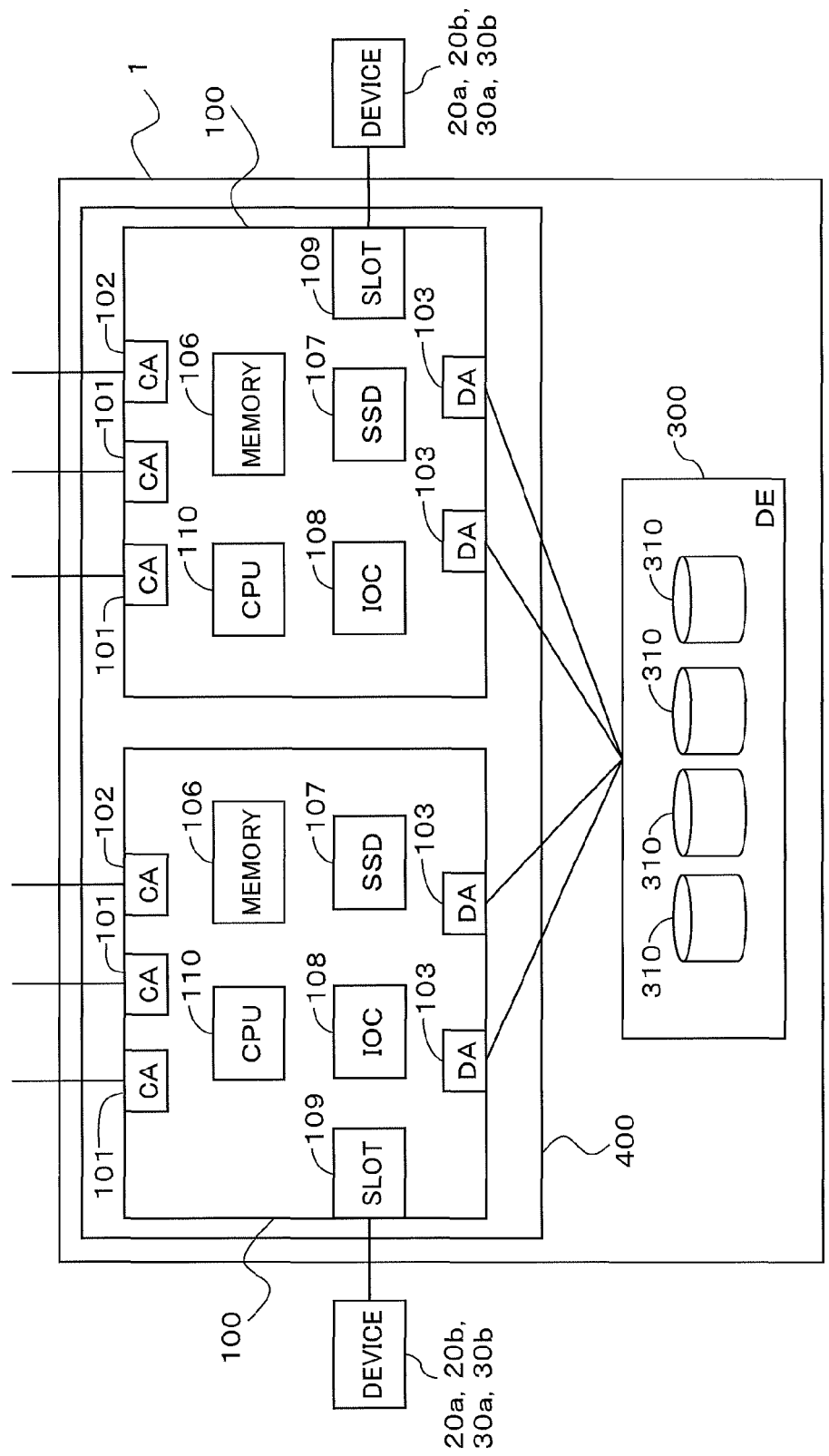
FIG. 1 is a diagram schematically illustrating a hardware configuration of a storage apparatus which includes a storage control apparatus (information processing apparatus) according to an embodiment.

Hereinafter, embodiments of an information processing apparatus, a storage control apparatus, and a program disclosed in this application will be described in detail with reference to the drawings. However, the following embodiments are given as merely exemplary, and it is not intended to exclude various modifications and various technical applications which are not specified in the embodiments. In other words, the embodiments can be implemented in various forms within a scope not departing from the spirit thereof. Further, there is no purpose of exclusively including only the components in the drawings, but other functions can be included. Then, the respective embodiments can be implemented by appropriately combining each other in a scope where the processing contents are not contradicted.

[1] Configurations of Storage Control Apparatus (Information Processing Apparatus) of Embodiment First, an OS in a storage control apparatus (information processing apparatus) of a single OS will be described with reference to FIG. 2. In addition, FIG. 2 is a diagram schematically illustrating the OS in the storage control apparatus.

Figure 2:
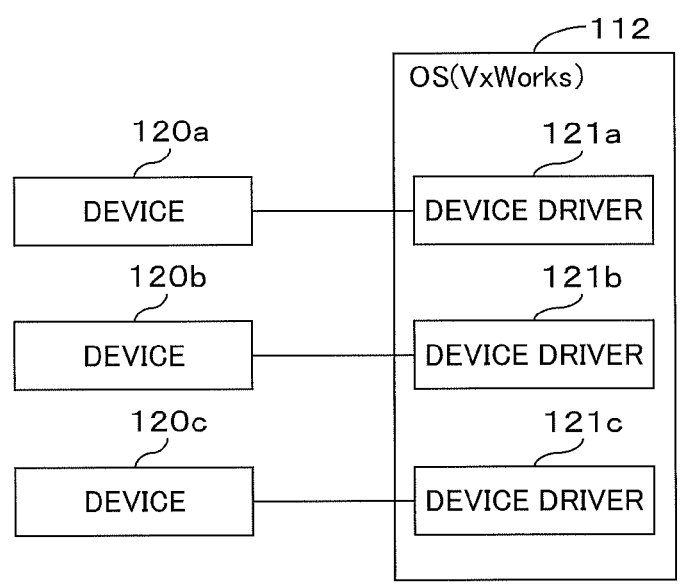
FIG. 2 is a diagram schematically illustrating an OS in a storage control apparatus (information processing apparatus) of a single OS.

FIG. 2, for example, illustrates a case where a single OS 112 of VxWorks (registered trademark) in a central processing unit (CPU) of the storage control apparatus is operated. VxWorks is an example of a SAN OS which performs SAN control. Further, in FIG. 2, devices 120a to 120c for VxWorks are connected to the OS 112. The devices 120a to 120c for VxWorks, for example, are network interface cards (NIC) or fibre channel (FC) cards, all of which are managed by the OS 112.

At this time, the OS 112 includes device drivers 121a to 121c for the devices 120a to 120c. The device drives 121a to 121c used herein are full function drivers. The full function driver has a maintenance function which is used in control of the devices at the time of startup and maintenance, and a device driver function which is used in control of the devices 120a to 120c at the time of operation. Herein, the maintenance function realizes a function which is useful for maintenance control such as informing of states of the respective devices 120a to 120c. Further, the device driver function corresponds to a function of using the devices 120a to 120c as devices under communication control in a case where the devices 120a to 120c, for example, are the NICs.

A network attached storage (NAS) function is added to an SAN apparatus provided with such an SAN OS 112 using the following method. In this method, a virtualization OS (hypervisor system) is introduced, two OSs, VxWorks and Linux (registered trademark), are installed on one system hardware, and the NAS function (for example, a network file system (NFS), Samba) is mounted on one OS (Linux). Therefore, a unified storage apparatus having both the SAN function and the NAS function is realized.

Since there is software of the NAS function which operates stably on Linux, the above method is a reasonable method. In this case, since a disk used by the NAS function belongs to VxWorks, data received by Linux is written in the disk of VxWorks by the SAN function.

At this time, when a new disk for the NAS (for example, the NIC) is added, the disk is under control of Linux. However, since the disk is mounted as hardware of the unified storage apparatus, the maintenance of the disk is desired to be performed according to a maintenance sequence executed by VxWorks before the disk is added. This is because when the configuration of a maintenance guide screen and the maintenance sequence are different with respect to each OS, it is difficult for a user to use.

In other words, the same function as the maintenance control function mounted on VxWorks is used even for the disk added for the NAS.

Therefore, there is a need as follows:

(1) Performing the whole control relating to maintenance by VxWorks, or (2) Mounting, on Linux, the same maintenance control function as that mounted in VxWorks However, in a case where whole control as described in the above (1) relating to maintenance is performed by VxWorks, it is necessary for Linux to acquire all the information desired by VxWorks and inform VxWorks of the information. Further, for example, in a case where Linux is suspended, it is not possible to acquire information desired by VxWorks at a desired timing of VxWorks.

Further, as described in the above (2), in a case where Linux is mounted with the same maintenance control function as that mounted on VxWorks, maintenance control functions are doubly developed and mounted for a plurality of OSs according to both VxWorks and Linux, which is inefficient.

Furthermore, as a common problem found in the above (1) and (2), there is a problem as follows. In a system configuration such as the unified storage apparatus described above, the disk is managed by VxWorks. Although only Linux of two OSs is left alive, Linux having no disk is not possible to function, so that a case where only Linux is left alive does not happen. However, since the disk is managed by VxWorks, there is a case where only VxWorks is left alive. In this case, even when Linux is suspended, it is desirable that the disk on Linux be able to be maintained.

From the viewpoint described above, in the system configuration such as the unified storage apparatus described above, it can be said that it is unreasonable to load, on Linux, the maintenance function for the disk added to Linux.

Hereinafter, a storage apparatus 1 which includes the storage control apparatus (information processing apparatus) 100 according to the embodiment will be described with reference to FIG. 1. In addition, FIG. 1 is a diagram schematically illustrating a hardware configuration of the storage apparatus 1 which includes the storage control apparatus 100 according to the embodiment.

The storage apparatus 1 virtualizes storage devices 310 contained in a driver enclosure (DE; a storage unit) 300 to form a virtual storage environment. Then, the storage apparatus 1 provides a virtual volume to a host apparatus (not illustrated) which is an upper-level apparatus.

The storage apparatus 1 is communicably connected to one or more host apparatuses (not illustrated). The host apparatus and the storage apparatus 1 are connected through communication adapters (CAs) 101 and 102.

The host apparatus, for example, is an information processing apparatus which has a server function, and transmits/receives a command of the NAS or the SAN between the storage apparatus 1. The host apparatus, for example, transmits a disk access command such as read/write in the NAS to the storage apparatus 1, and thus performs reading/writing of data with respect to the volume which is provided by the storage apparatus 1.

Then, the storage apparatus 1 performs processes such as reading/writing of data with respect to an actual storage corresponding to the volume according to an input/output request (for example, a read command or a write command) which is performed on the volume from the host apparatus. In addition, there are cases in which the input/output request from the host apparatus may be referred to as an I/O command or an I/O request.

As illustrated in FIG. 1, the storage apparatus 1 includes a controller enclosure 400 which contains a plurality (two in the embodiment) of controller modules (CMs) 100 and one or more (one in the example illustrated in FIG. 1) driver enclosures 300.

The driver enclosure (storage unit) 300 is possible to contain one or more (four in the example illustrated in FIG. 1) storage devices (physical disks; storage units) 310, and provides storage areas (actual volume, actual storage) of these storage devices 310 to the storage apparatus 1.

For example, the driver enclosure 300 includes a plurality of slots (not illustrated), and the storage devices 310 such as a hard disk drive (HDD) and a solid state drive (SSD) are inserted into these slots to change the capacity of the actual volume at any time. Further, the plurality of storage devices 310 are used to construct redundant arrays of inexpensive disks (RAID).

The driver enclosure 300 is connected to each of a plurality of (two in the embodiment) device adapters (DAs) 103 in each CM 100. Then, the respective CMs 100 can make access to the driver enclosure 300 to write or read data. In other words, the respective CMs 100 are connected to the storage devices 310 of the driver enclosure 300, so that the access paths to the storage devices 310 become redundant.

The controller enclosure 400 includes one or more (two in the example illustrated in FIG. 1) CMs 100.

Each CM 100 is a controller (storage control apparatus) which controls the operation in the storage apparatus 1, and performs various types of control such as access control to the storage devices 310 of the driver enclosure 300 according to the I/O command transmitted from the host apparatus. Further, the respective CMs 100 have substantially the same configuration.

In addition, in the drawings, the same symbols as those described above indicate the identical or similar portions, and thus the descriptions thereof will not be repeated.

The respective CMs 100 are configured in pair, and one of the paired CMs 100 generally performs various types of control as a primary CM. However, when the primary CM 100 fails in its operation, the secondary CM 100 takes over the operation from the primary CM.

The respective CMs 100 are connected to the host apparatus through the CAs 101 and 102. Then, the respective CMs 100 receive a command such as read/write which is transmitted from the host apparatus, and performs control on the storage devices 310 through the DAs 103. Further, the respective CMs 100 are connected to each other through an interface (not illustrated) such as a PCI (peripheral component interconnect) Express.

As illustrated in FIG. 1, the CM 100 includes the CAs 101 and 102 and the plurality (two in the example illustrated in FIG. 1) of DAs 103 and 103, and further includes a central processing unit (CPU) 110, a memory 106, an SSD 107, an IOC 108, and a slot 109.

The CAs 101 and 102 receive data transmitted from the host apparatus and the like, or transmits data output from the CM 100 to the host apparatus and the like. In other words, the CAs 101 and 102 controls data input/output (I/O) with respect to an external apparatus such as the host apparatus.

The CA 101 is a network adaptor which enables the connection with the host apparatus for communication through the NAS, and, for example, is a local area network (LAN) interface and the like.

The respective CMs 100 are connected by the host apparatus and the like and by the NAS through a communication line (not illustrated) using the CA 101, and perform an I/O command reception and a data transmission/reception. In the example illustrated in FIG. 1, each CM 100 includes two CAs 101 and 101.

The CA 102 is a network adaptor which enables the connection with the host apparatus for communication through the SAN, and, for example, is an iSCSI interface and an FC interface.

The CMs 100 are connected by the host apparatus and the like and by the SAN through the communication line (not illustrated) using the CA 102, and perform the I/O command reception and the data transmission/reception. In the example illustrated in FIG. 1, each CM 100 includes one CA 102.

The DA 103 is an interface which enables the connection with the driver enclosure 300 and the storage devices 310 for communication. The DA 103 is connected to the storage devices 310 of the driver enclosure 300, and each CM 100 performs the access control to the storage devices 310 based on the I/O command received from the host apparatus.

Each CM 100 performs data write/read on the storage devices 310 through the DA 103. Further, in the example illustrated in FIG. 1, each CM 100 includes two DAs 103 and 103. Then, in each CM 100, each DA 103 is connected to the driver enclosure 300.

With this configuration, each CM 100 can perform data write/read on the storage devices 310 of the driver enclosure 300.

The SSD 107 is a storage device which stores a program executed by the CPU 110 and various kinds of data.

The memory 106 is a storage device which temporarily stores various kinds of data and a program, and includes a storage area (not illustrated) and a cache area. The cache area temporarily stores data received from the host apparatus and data to be transmitted to the host apparatus. The storage area is used to temporarily store and develop the data and the program when the CPU 110 executes the program. In addition, the program includes an application program which causes the CPU 110 to function as a processing unit which will be described below with reference to FIG. 3.

The input output controller (IOC) 108 is a control device which controls data transmission in the CM 100, and for example realizes DMA (Direct Memory Access) transfer in which the data stored in the memory 106 is transferred without passing through the CPU 110.

The slot 109 is a slot into which devices 20a, 20b, 30a, and 30b such as the NIC and the like are inserted for connection, and configured to allow insertion or removal of the devices 20a, 20b, 30a, and 30b as needed. While only one slot 109 is illustrated in FIG. 1, two or more slots 109 are provided in practice and one card-type device is inserted or removed with respect to each slot 109.

The CPU 110 is a processing device which performs various control and calculations, and, for example, is a multi-core processor (multi-CPU). The CPU 110 executes the OS and the program stored in the SSD 107 and the like, thereby realizing various functions including a function as the processing unit which will be described below with reference to FIG. 3.

The CPU 110 executes a hypervisor 11 (see FIG. 3) which is a virtualization OS, and executes a plurality of virtual machines (VMs) on the hypervisor 11, thereby causing a plurality of OSs 12 and 13 (see FIG. 3) to be executed. A plurality of guest OSs 12 and 13 can share hardware resources such as the CPU 110, the memory 106, the SSD 107, and the slot 109.

In addition, each CM 100 may include a plurality of CPUs 110, and execute the hypervisor 11 on the plurality of CPUs 110.

Figure 3:
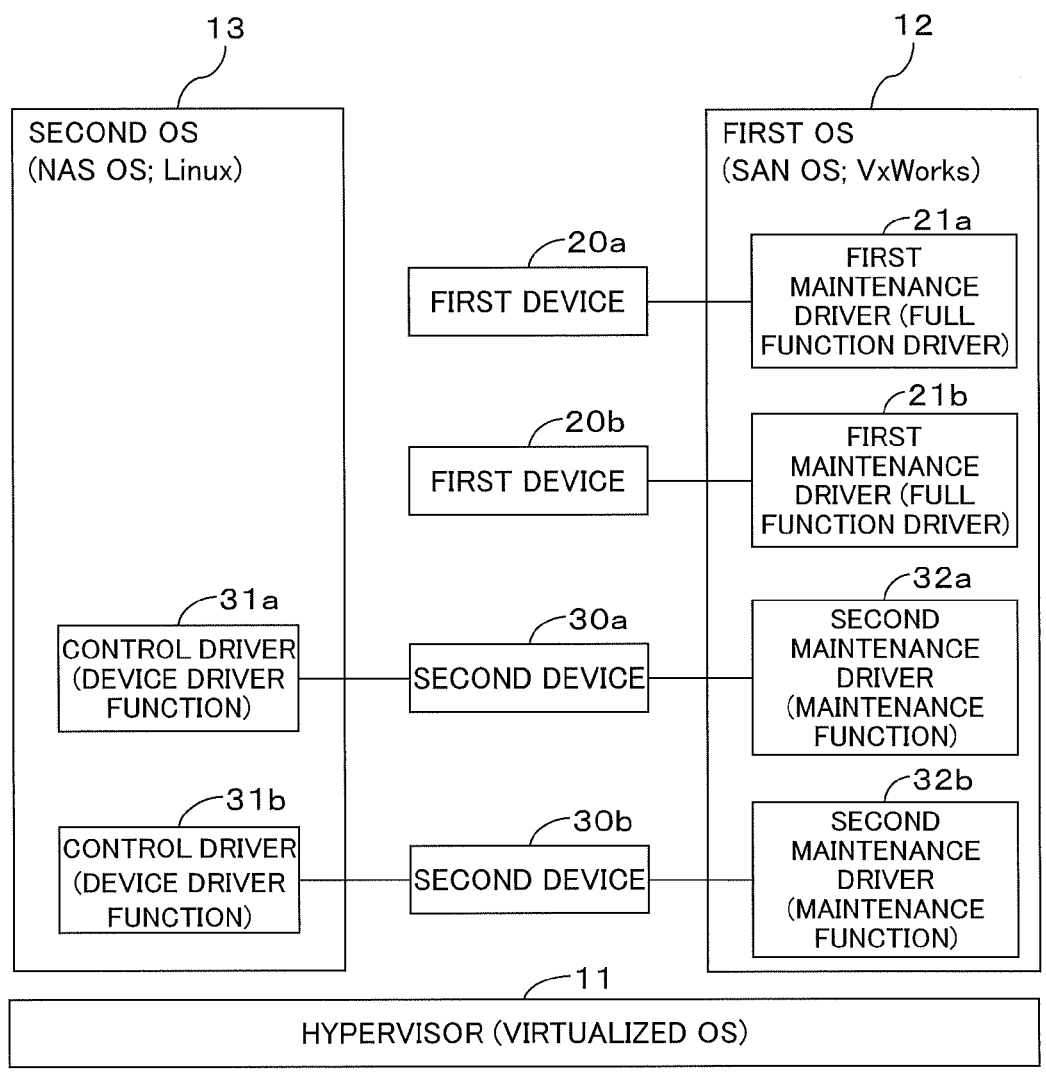
FIG. 3 is a diagram schematically illustrating a plurality of OSs on a hypervisor in the storage control apparatus (information processing apparatus) according to the embodiment.

Next, a plurality (two in the embodiment) of OSs 12 and 13 on the hypervisor 11 in each CM 100 according to the embodiment will be described with reference to FIG. 3. FIG. 3 is a diagram schematically illustrating the plurality of OSs 12 and 13 on the hypervisor 11 in each CM 100 according to the embodiment. As illustrated in FIG. 3, in the embodiment, the SAN OS (first OS) 12 and the NAS OS (second OS) 13 are executed on the hypervisor 11.

The SAN OS 12 performs the SAN control to manage first devices 20a and 20b such as the NIC and an FC card. In addition, FIG. 3 illustrates two first devices 20a and 20b, but the invention is not limited thereto. Further, only one first device may be provided, or three or more first devices may be provided.

The NAS OS 13 performs NAS control to manage second devices 30a and 30b such as the NIC. In addition, FIG. 3 illustrates two second devices 30a and 30b, but the invention is not limited thereto. Further, only one second device may be provided, or three or more second devices may be provided.

Then, the CPU 110 in each CM 100 according to the embodiment functions as the processing unit as described below.

In other words, the processing unit causes the SAN OS 12 and the NAS OS 13 to operate. Further, the processing unit causes the SAN OS 12 to load first maintenance drivers 21a and 21b which respectively correspond to the first devices 20a and 20b, and causes the first maintenance drivers 21a and 21b to execute the maintenance control of the first devices 20a and 20b, respectively. Furthermore, the processing unit causes the SAN OS 12 to load second maintenance drivers 32a and 32b which respectively correspond to the second devices 30a and 30b, and causes the second maintenance drivers 32a and 32b to execute the maintenance control of the second devices 30a and 30b, respectively.

Further, the processing unit causes the SAN OS 12 to obtain information relating to the second devices 30a and 30b using the second maintenance drivers 32a and 32b during a period when the NAS OS 13 is suspended in operation, and to execute the maintenance control of the second devices 30a and 30b. Furthermore, the processing unit causes the SAN OS 12 to execute setting control of the second devices 30a and 30b using the second maintenance drivers 32a and 32b during a period when the NAS OS 13 is suspended in operation.

Further, the first maintenance drivers 21a and 21b include a control function (device driver function) which is used in control performed by the SAN OS 12 when the first devices 20a and 20b operate. In other words, the first maintenance drivers 21a and 21b are the full function drivers, and include the maintenance function which is used in control of the devices at the time of startup and maintenance, and the device driver function (control driver) which is used in control of the first devices 20a and 20b at the time of operation. Herein, the maintenance function realizes a function which is useful for maintenance control such as informing of states of the first devices 20a and 20b. Further, the device driver function corresponds to a function of using the first devices 20a and 20b as devices under communication control in a case where the first devices 20a and 20b, for example, are the NICs.

Furthermore, the processing unit causes the NAS OS 13 to load control drivers 31a and 31b which correspond to the second devices 30a and 30b, respectively. Herein, the control drivers 31a and 31b are used in control performed by the NAS OS 13 when the second devices 30a and 30b operate. Therefore, each of the second maintenance drivers 32a and 32b which is loaded on the SAN OS 12 has only the maintenance function which realizes a function useful for the maintenance control such as informing of states of the first devices 20a and 20b. Further, each of the control drivers 31a and 31b which is loaded on the NAS OS 13 has a device driver function which is used in control of the second devices 30a and 30b at the time of operation.

In addition, as illustrated in FIG. 3, in the CPU 110 of each CM (storage control apparatus) 100 according to the embodiment, a first virtual machine and a second virtual machine are established on the hypervisor 11. Then, the SAN OS (for example, VxWorks; the first OS) 12 which performs the SAN control is installed in the first virtual machine, and the NAS OS (for example, Linux; the second OS) 13 which performs the NAS control is installed in the second virtual machine.

Further, in FIG. 3, the devices (first devices) 20a and 20b for VxWorks are connected to the SAN OS 12. For example, the devices 20a and 20b for VxWorks are the NICs or the FC cards, and managed by the SAN OS 12. Similarly, in FIG. 1, the devices (second devices) 30a and 30b for Linux are connected to the NAS OS 13. For example, the devices 30a and 30b for Linux are the NICs, and managed by the NAS OS 13.

With the above-mentioned configuration, the SAN OS 12 obtains the information relating to the second devices 30a and 30b using the maintenance function of the second maintenance drivers 32a and 32b respectively, and performs the maintenance control of the second devices 30a and 30b.

Further, the SAN OS 12 performs the setting control of the second devices 30a and 30b, for example, PCI Configuration setting/resource allocation setting using the second maintenance drivers 32a and 32b.

In other words, the SAN OS (VxWorks) 12 obtains the information relating to the second devices 30a and 30b under the management of the NAS OS (Linux) 13 through the control drivers 31a and 31b on the SAN OS 12.

Therefore, similarly to the sequences of the maintenance control and the like on the first devices 20a and 20b under the management of the SAN OS (VxWorks) 12, the SAN OS (VxWorks) 12 performs the maintenance control and the like on the second devices 30a and 30b under the management of the NAS OS (Linux) 13 using the obtained information. At this time, the maintenance control and the like are mediated by the hypervisor 11.

Further, in the embodiment, the setting of the second devices 30a and 30b on Linux which is the NAS OS 13 can be controlled by VxWorks which is the SAN OS 12. Herein, a PCI-Express device is assumed as the second devices 30a and 30b. Since the resources of PCI-Express are shared between Linux and VxWorks, when the resources are set without any restriction, there is a risk to cause conflicts between the resources. Therefore, Linux is not allowed to freely set the resources of the PCI-Express. However, in the embodiment, the PCI configurations are completely set before the startup of Linux. Accordingly, it is possible to control the resource use on Linux without causing conflicts between the resources.

[2] Operations of Storage Control Apparatus (Information Processing Apparatus) of Embodiment Next, the operations of the CM 100 which is the storage control apparatus (information processing apparatus) according to the embodiment as described above will be described with reference to FIGS. 4 to 8.

Figure 4:
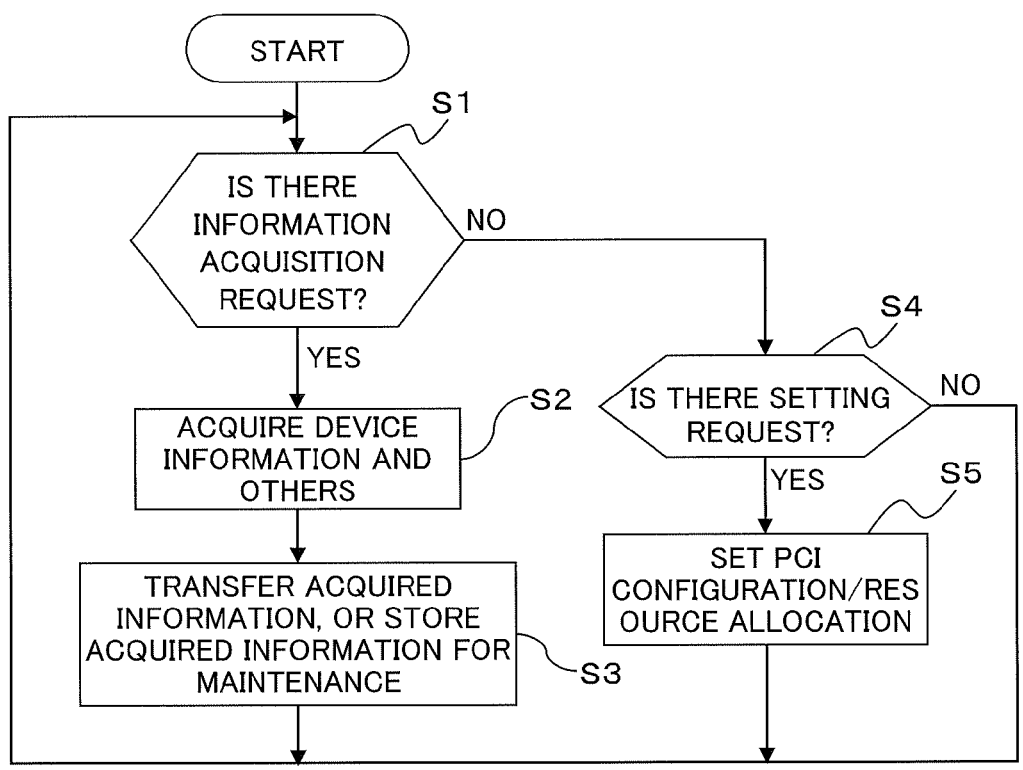
FIG. 4 is a flowchart for describing an operation of a maintenance driver (second maintenance driver) in the storage control apparatus (information processing apparatus) illustrated in FIG. 1.

First, the operations of the second maintenance drivers 32a and 32b in the CM 100 according to the embodiment will be described according to a flowchart (Steps S1 to S5) illustrated in FIG. 4.

The second maintenance drivers 32a and 32b determines whether there is a request for acquiring information in the SAN OS 12 (Step S1). When receiving the request for acquiring information in the SAN OS 12 (YES route of Step S1), the second maintenance drivers 32a and 32b obtain information relating to the second devices 30a and 30b, respectively (Step S2). Then, the second maintenance drivers 32a and 32b hand over the acquired information to the request source, or store the information in a memory 40 or the like for maintenance (Step S3). Thereafter, the second maintenance drivers 32a and 32b return to the process of Step S1.

Further, in a case where there is no request for acquiring information (NO route of Step S1), the second maintenance drivers 32a and 32b determine whether there is a request for setting in the SAN OS 12 (Step S4). When receiving the request for setting in the SAN OS 12 (YES route of Step S4), the second maintenance drivers 32a and 32b perform the setting control of the second devices 30a and 30b, respectively; for example, the PCI configuration setting or the resource allocation setting are performed according to the content requested from the request source (Step S5). Thereafter, the second maintenance drivers 32a and 32b return to the process of Step S1. In addition, in a case where there is no request for setting (NO route of Step S4), the second maintenance drivers 32a and 32b return to the process of Step S1.

Figure 5:
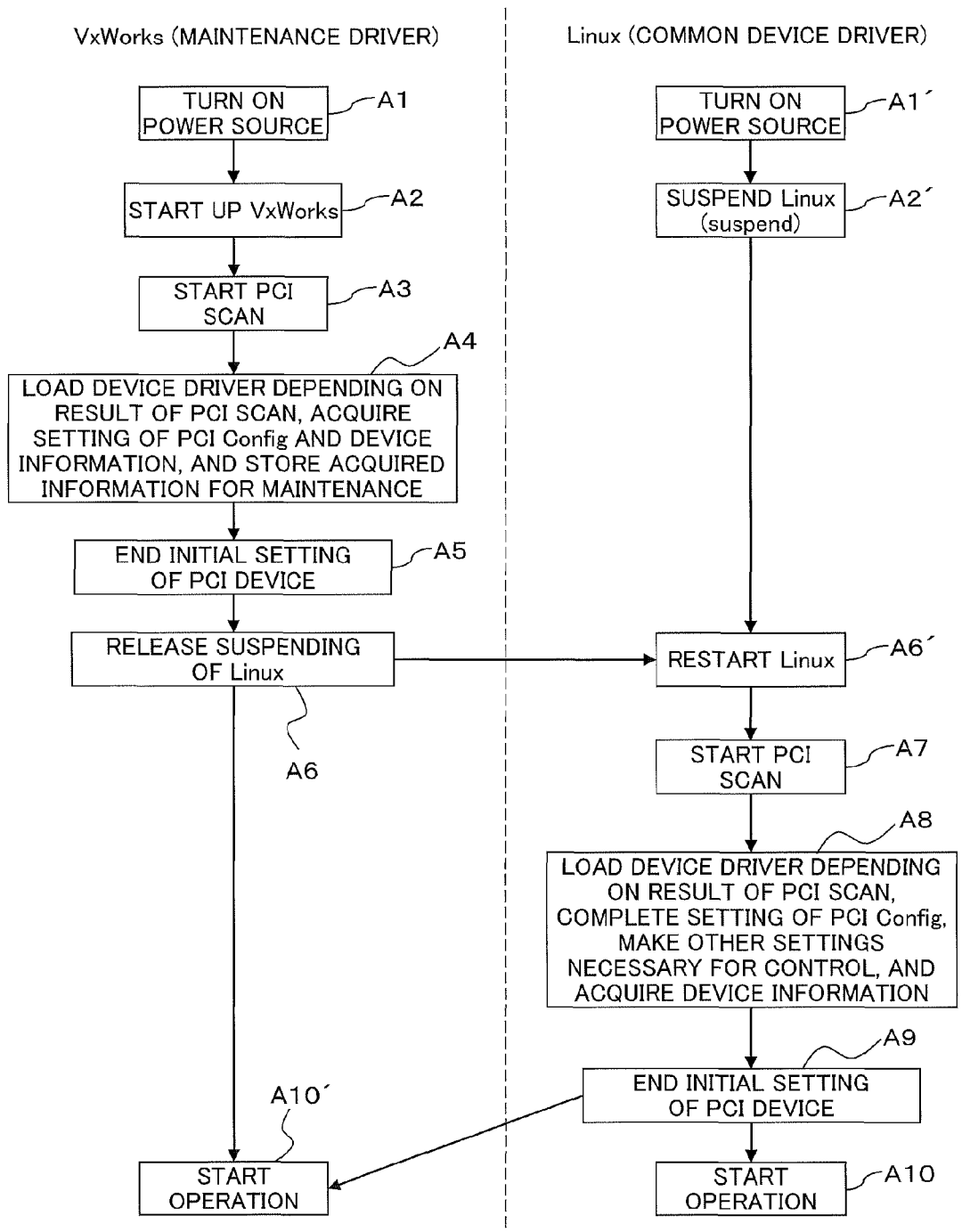
FIG. 5 is a diagram for describing a startup sequence of the storage control apparatus (information processing apparatus) illustrated in FIG. 1.

Next, a startup sequence (Steps A1 to A10, A1', A2', A6', and A10') performed by the CM 100 which is the storage control apparatus (information processing apparatus) illustrated in FIG. 1 will be described with reference to FIG. 5.

At the time of startup, power sources of the first OS (hereinafter, referred to as VxWorks) 12 and the second OS (hereinafter, referred to as Linux) 13 are turned on (Steps A1 and A1'). Then, VxWorks begins to start up (Step A2), and Linux also starts up. In this case, Linux is temporarily suspended after starting up (Step A2').

Thereafter, a PCI scan is started in VxWorks (Step A3). Then, the first maintenance drivers (full function drivers) 21a and 21b or the second maintenance drivers (maintenance functions) 32a and 32b is loaded depending on a result of the PCI scan. Further, the setting of PCI configurations and the acquisition of device information are performed on the second devices 30a and 30b under the management of Linux using the second maintenance drivers 32a and 32b, and the acquired information is stored in the memory 106 or the like for maintenance (Step A4).

Therefore, the initial setting of the PCI device on VxWorks is ended (Step A5). Then, the suspend state of Linux is released (Step A6), and thus the startup of Linux is restarted (Step A6').

The PCI scan is started in Linux (Step A7). Then, the control drivers (device driver functions) 31a and 31b are loaded depending on a result of the PCI scan. At this time, since the PCI configurations are completely set, other settings necessary for control are made and the device information is acquired (Step A8).

Accordingly, the initial setting of the PCI device on Linux is ended (Step A9), and VxWorks and Linux start the operations (Steps A10 and A10').

Figure 6:
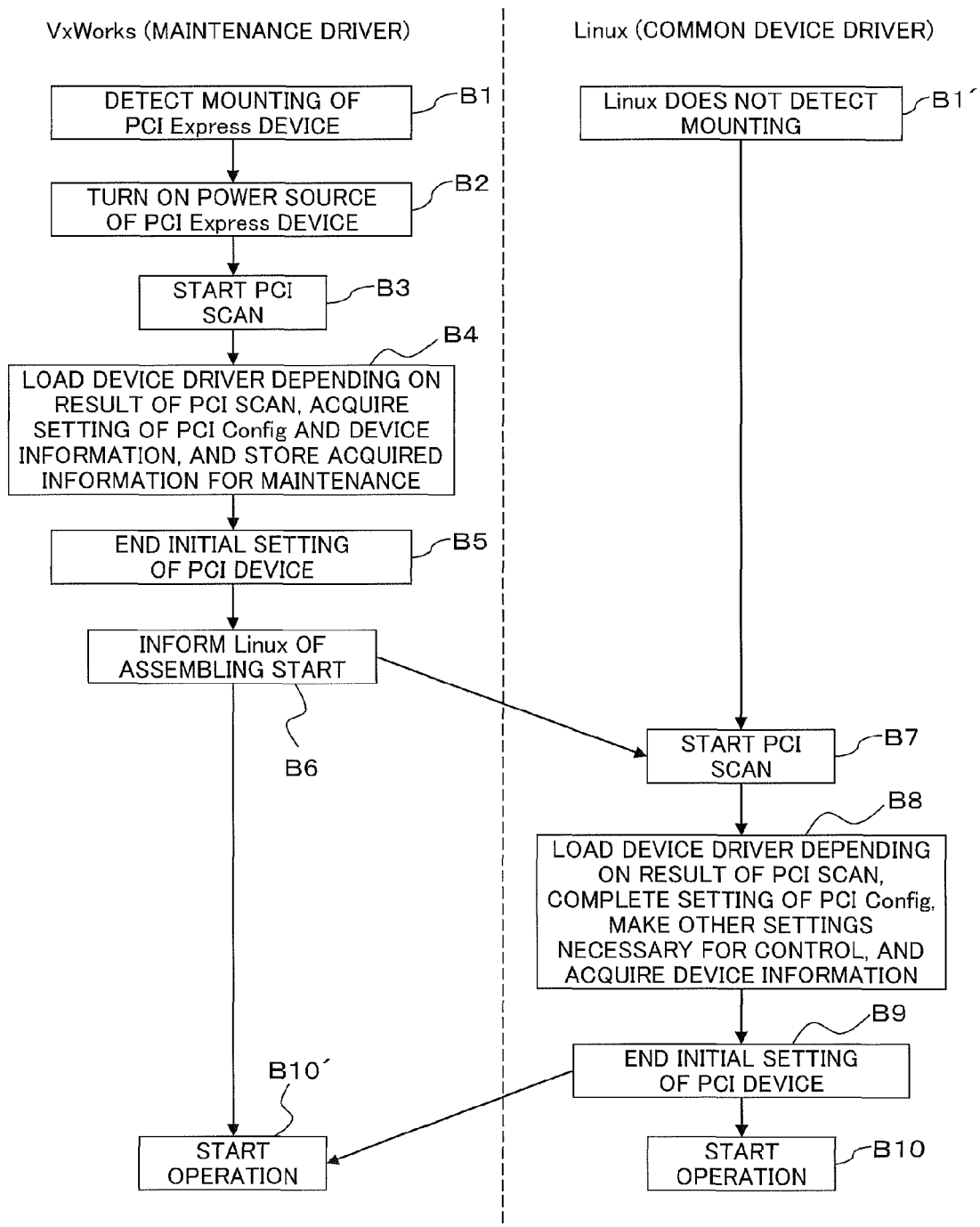
FIG. 6 is a diagram for describing an activation extension sequence of the storage control apparatus (information processing apparatus) illustrated in FIG. 1.

Next, an activation extension sequence (Steps B1 to B10, B1', and B10') performed by the CM 100 which is the storage control apparatus (information processing apparatus) illustrated in FIG. 1 will be described with reference to FIG. 6.

At the time of the activation extension, VxWorks detects that a PCI-Express device (second device) is mounted (Step B1). At this time, Linux has no recognition of mounting the device and thus does not detect the mounting (Step B1').

VxWorks turns on the power source of the PCI-Express device (Step B2), and starts the PCI scan (Step B3).

Then, the second maintenance driver (only for the maintenance function) for the mounted device is loaded depending on a result of the PCI scan. Further, the setting of PCI configurations and the acquisition of the device information are performed on the second device mounted on Linux using the second maintenance driver, and the acquired information is stored in the memory 106 and the like for maintenance (Step B4).

Accordingly, the initial setting of the PCI device on VxWorks is ended (Step B5), and Linux is informed that assembling of the mounted device is started (Step B6).

The PCI scan is started in Linux (Step B7). Then, the control driver (device driver function) for the mounted second device is loaded depending on a result of the PCI scan. At this time, since the PCI configurations are completely sets, other settings for control are made and the device information is acquired (Step B8).

Accordingly, the initial setting of the PCI device on Linux is ended (Step B9), and VxWorks and Linux are operated in a state in which a new device is extended and activated (Steps B10 and B10').

Figure 7:
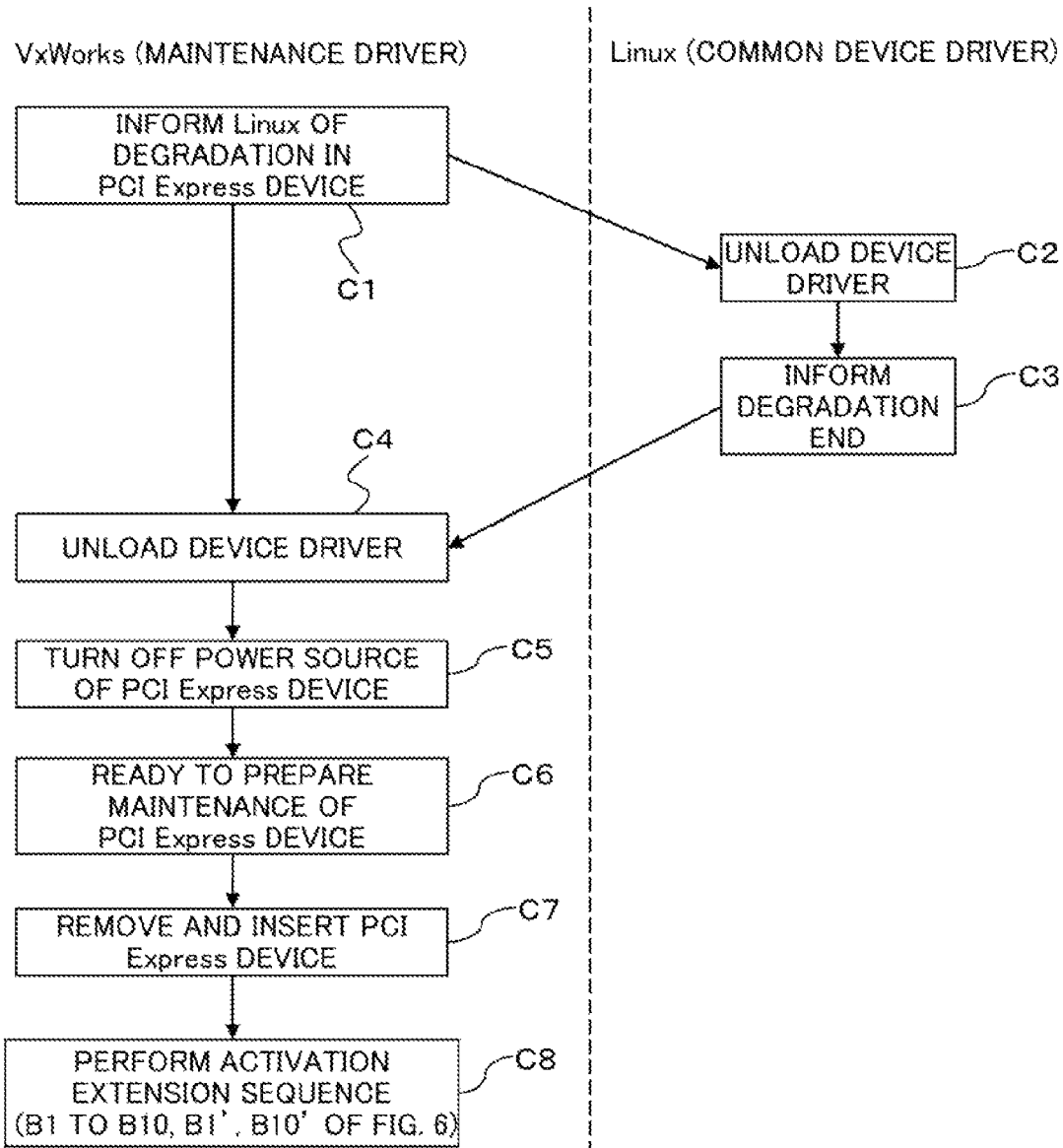
FIG. 7 is a diagram for describing an activation exchange sequence of the storage control apparatus (information processing apparatus) illustrated in FIG. 1 during a Linux operation.

Next, an activation exchange sequence (Steps C1 to C8) performed, under the Linux operation, by the CM 100 which is the storage control apparatus (information processing apparatus) illustrated in FIG. 1 will be described with reference to FIG. 7.

In a case where the activation exchange of a device (second device) is performed under the Linux operation, VxWorks informs Linux of degradation of the PCI-Express device (Step C1). When being informed of the degradation, Linux loads a driver (second driver) of an exchanging target device (Step C2), and informs VxWorks of degradation end (Step C3).

When being informed of the degradation end from Linux, VxWorks loads a driver (second maintenance driver) of the exchanging target device (Step C4), and turns off the power source of the exchanging target PCI-Express device (Step C5).

Accordingly, the maintenance of the PCI-Express device is ready (Step C6), the exchanging target PCI-Express device is removed and inserted (Step C7). In other words, the exchanging target device is removed, and a new device is inserted. When the new device is inserted, the same process (Steps B1 to B10, B1', and B10') as the activation extension sequence of FIG. 6 is performed (Step C8), and thus the activation exchange under the Linux operation is ended.

Next, an activation exchange sequence (Steps D1 to D10) performed, under the Linux suspension, by the CM 100 which is the storage control apparatus (information processing apparatus) illustrated in FIG. 1 will be described with reference to FIG. 8.

In a case where the activation exchange of a device (second device) is performed under the Linux suspension, VxWorks unloads a driver (second maintenance driver) of the exchanging target device (Step D1), and turns off the power source of the exchanging target PCI-Express device (Step D2).

Accordingly, the maintenance of the PCI-Express device has been ready (Step D3), the exchanging target PCI-Express device is removed and inserted (Step D4). In other words, the exchanging target device is removed, and a new device is inserted.

When the new device is inserted, VxWorks detects that the new PCI-Express device (second device) is mounted (Step D5). VxWorks turns on the power source of the PCI-Express device (Step D6), and starts the PCI scan (Step D7).

Then, the second maintenance driver for the mounted second device is loaded depending on a result of the PCI scan. Further, the setting of PCI configurations and the acquisition of the device information are performed on the mounted second device using the second maintenance driver, and the acquired information is stored in the memory 106 and the like for maintenance (Step D8).

Accordingly, the initial setting of the PCI device on VxWorks is ended (Step D9), and VxWorks waits for that Linux is restored (Step D10), so that the activation exchange under the Linux suspension is ended.

[3] Advantages of Embodiment

According to the embodiment, the second maintenance drivers 32a and 32b for the second devices 30a and 30b connected to the second OS (Linux) 13 is provided in the first OS (VxWorks) 12 on the hypervisor 11. Therefore, the first OS 12 becomes possible to perform the maintenance control and the like of the second devices 30a and 30b under the management of the second OS 13 according to the same sequence as that of the maintenance control of the first devices 20a and 20b connected to the first OS 12.

Thus, when a new OS is installed in the CM 100 which is the storage control apparatus (information processing apparatus) using the hypervisor 11 and a new function is added to the OS for a functional improvement, a maintenance interface to the added new function can be efficiently mounted. Further, as the maintenance interface to the added new function, the configuration of the same maintenance guide screen and the maintenance sequence as the related art can be used, and the user can perform the operations such as maintenance without uncomfortable feeling of the added new function. In other words, since there is no need to doubly mount the maintenance control function on the plurality of OSs, the maintenance control corresponding to each device managed by the plurality of OSs is efficiently performed.

Further, the first OS (VxWorks) 12 can acquire the information of the second devices 30a and 30b under the management of the second OS (Linux) 13 using the second maintenance drivers 32a and 32b. Therefore, even in a case where the second OS (Linux) 13 is suspended, the information desired by the first OS (VxWorks) 12 can be acquired at a desired timing of the first OS (VxWorks) 12. Furthermore, as described above with reference to FIG. 7, even when the second OS (Linux) 13 is suspended, it is possible to perform the maintenance control and the like of the second devices 30a and 30b on the second OS (Linux) 13.

[4] Others

Hitherto, the description has been made about preferred embodiments of the invention, but the invention is not limited to the related specific embodiments. The invention can be variously modified and changed within a scope not departing from the spirit of the invention.

The above-mentioned embodiment has been made described about a case where the information processing apparatus is the storage control apparatus for the unified storage apparatus, but the invention is not limited thereto. The invention is applied similarly to the above-mentioned embodiment and the same operational advantages can be obtained as long as the information processing apparatus is configured to connect the devices to each OS having the plurality of OSs mounted on the hypervisor.

Further, the above-mentioned embodiment has been described about a case where the first OA is VxWorks and the second OA is Linux, but the invention is not limited thereto. Furthermore, the above-mentioned embodiment has been described about a case where the two first devices and the two second devices are provided, but the invention is not limited thereto.

Some or all of the functions of the CPU 110 as the processing unit may be realized by a computer (including a micro-processing unit (MPU), a CPU, various terminals) which executes a predetermined program. The program, for example, may be provided in types of being recorded in a computer-readable recording medium such as a flexible disk, a CD (a CD-ROM, a CD-R, a CD-RW, and the like), a DVD (a DVD-ROM, a DVD-RAM, a DVD-R, a DVD-RW, a DVD+R, a DVD+RW, and the like), and a Blu-ray disk. In this case, the computer reads the program from the recording medium, and transfers and stores the program into an inner storage unit or an external storage unit for use.

According to the embodiment, it is possible to efficiently achieve the maintenance control of the plurality of devices, each of which is managed by the plurality of operating systems.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An information processing apparatus comprising:
a first device configured to be managed by a first operating system;
a second device configured to be managed by a second operating system; and
a processing unit configured to cause the first operating system and the second operating system to operate, cause the first operating system to load a first maintenance driver corresponding to the first device, cause the first maintenance driver to perform maintenance control of the first device, cause the first operating system to load a second maintenance driver corresponding to of the second device, and cause the second maintenance driver to perform maintenance control of the second device, wherein
the first maintenance driver has both a first maintenance function which is used for maintenance control of the first device at a time of startup and maintenance and a control function which is used in control performed by the first operating system when the first device operates, and
the second maintenance driver has only a second maintenance function which is used for maintenance control of the second device at the time of startup and maintenance; and
wherein the processing unit causes the first operating system to obtain information relating to the second device, and to perform the maintenance control of the second device, using the second maintenance driver during a period when the second operating system is suspended in operation.

2. The information processing apparatus according to claim 1, wherein
the processing unit causes the first operating system to perform setting control of the second device using the second maintenance driver during a period when the second operating system is suspended in operation.

3. The information processing apparatus according to claim 1, wherein
the first operating system is a storage area network (SAN) operating system which performs SAN control, and
the second operating system is a network attached storage (NAS) operating system which performs NAS control.

4. The information processing apparatus according to claim 1, further comprising
a control driver configured to be used in control performed by the second operating system when the second device operates.

5. A storage control apparatus which controls a storage unit, comprising:
a first device configured to be managed by a first operating system which performs storage area network (SAN) control;
a second device configured to be managed by a second operating system which performs network attached storage (NAS) control; and
a processing unit configured to cause the first operating system and the second operating system to operate, cause the first operating system to load a first maintenance driver corresponding to the first device, cause the first maintenance driver to perform maintenance control of the first device, cause the first operating system to load a second maintenance driver corresponding to the second, and cause the second maintenance driver to perform maintenance control of the second device, wherein
the first maintenance driver has both a first maintenance function which is used for maintenance control of the first device at a time of startup and maintenance and a control function which is used in control performed by the first operating system when the first device operates, and
the second maintenance driver has only a second maintenance function which is used for maintenance control of the second device at the time of startup and maintenance; and
wherein the processing unit causes the first operating system to obtain information relating to the second device, and to perform the maintenance control of the second device, using the second maintenance driver during a period when the second operating system is suspended in operation.

6. The storage control apparatus according to claim 5, wherein
the processing unit causes the first operating system to perform setting control of the second device using the second maintenance driver during a period when the second operating system is suspended in operation.

7. The storage control apparatus according to claim 5, further comprising
a control driver configured to be used in control performed by the second operating system when the second device operates.

8. A non-transitory computer-readable recording medium having stored therein a program, wherein the program, when executed by a computer, causes the computer to perform causing a first operating system managing a first device and a second operating system managing a second device to operate,
causing the first operating system to load a first maintenance driver corresponding to the first device, and causing the first maintenance driver to perform maintenance control of the first device, and
causing the first operating system to load a second maintenance driver corresponding to the second device, and causing the second maintenance driver to perform maintenance control of the second device, wherein
the first maintenance driver has both a first maintenance function which is used for maintenance control of the first device at a time of startup and maintenance and a control function which is used in control performed by the first operating system when the first device operates, and
the second maintenance driver has only a second maintenance function which is used for maintenance control of the second device at the time of startup and maintenance; and
wherein the program causes the computer to perform causing the first operating system to obtain information relating to the second device and to execute the maintenance control of the second device, using the second maintenance driver during a period when the second operating system is suspended in operation.

9. The non-transitory computer-readable recording medium having stored therein the program according to claim 8, wherein
the program causes the computer to perform
causing the first operating system to perform setting control of the second device using the second maintenance driver during a period when the second operating system is suspended in operation.

10. The non-transitory computer-readable recording medium having stored therein the program according to claim 8, wherein
the first operating system is a storage area network (SAN) operating system which performs SAN control, and
the second operating system is a network attached storage (NAS) operating system which performs NAS control.

* * * * *